(12) United States Patent
Lummis et al.

(10) Patent No.: US 8,186,400 B2
(45) Date of Patent: May 29, 2012

(54) COVER FOR MODULES OF FIBROUS MATERIAL

(75) Inventors: Thomas Lummis, Marietta, GA (US); Barton Wade Daniel, Kennesaw, GA (US)

(73) Assignee: L.P. Brown Company, Inc., Memphis, TN (US)

(*) Notice: Subject to any disclaimer, the term of this patent is extended or adjusted under 35 U.S.C. 154(b) by 1353 days.

(21) Appl. No.: 10/758,459

(22) Filed: Jan. 15, 2004

(65) Prior Publication Data

US 2005/0155684 A1 Jul. 21, 2005

(51) Int. Cl.
*B65D 71/00* (2006.01)
(52) U.S. Cl. .................. 150/154; 206/83.5
(58) Field of Classification Search .......... 206/83.5; 150/154; 410/97, 100
See application file for complete search history.

(56) References Cited

U.S. PATENT DOCUMENTS

| | | | | |
|---|---|---|---|---|
| 2,402,709 A * | 6/1946 | Swasey | .............. | D12/335 |
| 2,705,461 A * | 4/1955 | Campbell | .............. | 410/97 |
| 3,011,820 A * | 12/1961 | Frieder et al. | .............. | 294/77 |
| 3,173,539 A * | 3/1965 | Looker | .............. | 206/597 |
| 3,749,003 A | 7/1973 | Wilkes et al. | | |
| 3,941,047 A | 3/1976 | Orlando et al. | | |
| 4,071,138 A | 1/1978 | Wright | | |
| 4,184,425 A | 1/1980 | Haney et al. | | |
| 4,308,905 A * | 1/1982 | Gallagher | .............. | 150/165 |
| 4,869,363 A | 9/1989 | Goldberg | | |
| 5,328,310 A * | 7/1994 | Lockney | .............. | 410/97 |
| 5,386,905 A | 2/1995 | Porter | | |
| 5,511,655 A | 4/1996 | Porter | | |
| 5,720,382 A | 2/1998 | Porter | | |
| 5,904,243 A | 5/1999 | Porter | | |
| 6,581,545 B1 * | 6/2003 | Foster | .............. | 119/482 |
| 6,637,991 B2 * | 10/2003 | Looker et al. | .............. | 410/97 |
| 2003/0226846 A1 * | 12/2003 | Horwath | .............. | 220/287 |

* cited by examiner

*Primary Examiner* — Tri Mai
(74) *Attorney, Agent, or Firm* — Walker, McKenzie & Walker, P.C.

(57) ABSTRACT

A cover for a module of fibrous material consists of a top member; a first side wall member with a first gap at its midpoint; a second side wall member with a second gap at its midpoint; first and second end wall members; a channel running along the bottom edge of the wall members and interrupted by the firs and second gaps; a first support strap at the midpoint of the first side wall member and within the first gap; a second support strap at the midpoint of the second side wall member and within the second gap; a securing strap having first and second ends and running through the channel, said securing strap supported by the first and second support straps as it passes through the first and second gaps; and a buckle securing the first and second ends of the securing strap.

15 Claims, 2 Drawing Sheets

COVER FOR MODULES OF FIBROUS MATERIAL

TECHNICAL FIELD OF THE INVENTION

This invention generally relates to a cover for compressed modules or bales of fibrous material.

DESCRIPTION OF THE RELATED ART

Cotton farmers commonly use module builders to form compressed modules of picked cotton, which may be left in the field until the cotton can be transported for processing. This process may leave the cotton modules exposed to the elements for weeks at a time, resulting in significant damage. Flat tarps are commonly secured around the modules to protect them from rain and wind. However, these flat covers are difficult to secure to the modules strongly enough to prevent the covers from being blown off. In addition, gaps formed in the tarp as a result of folding the tarps over to fit the box-like shape of the modules allow wind, rain and moisture to penetrate the tarp and damage the module.

Improved covers for these modules have been developed and designed to fit the general outline of the modules. These covers frequently utilize straps to secure the cover to the module. Some of these covers incorporate multiple hanger mechanisms along the sides of the cover to support the straps keep wind from lifting the top of the cover off of the module. The use of multiple hangers along each side of the cover to support the straps distributes the tensional force induced on the cover top by the strap relatively evenly among the multiple hangers. While this arrangement is fairly effective during normal wind conditions, it has been found to be significantly less effective during peak wind conditions involving significant wind gusts. Because a significant portion of the cotton belt is located in a geographic area that is very flat and prone to significant fluctuations in wind levels, it is critical that a cover be capable of handling sudden wind gusts.

Therefore, it would be desirable to provide a cover for modules of fibrous materials that generally conforms to the module and is securely connected to the module for maximum protection from the elements and, in particular, is capable of withstanding peak wind conditions.

The present invention is directed to overcoming one or more of the problems set forth above.

SUMMARY OF THE INVENTION

An aspect of the present invention is to provide an improved cover for modules of fibrous material that minimizes the presence of any gaps in the cover when folded over the module and is provided with a more effective means of securing the cover to the module.

Another aspect of the present invention is to provide an improved cover for modules of fibrous material that optimizes the location of tensional forces on the cover to enhance the cover's ability to withstand peak wind conditions.

In accordance with the above aspect of the invention, there is provided a cover for a module of fibrous material that consists of a top member; a first side wall member defining a first gap approximately at a midpoint of the first side wall member; a second side wall member defining a second gap approximately at a midpoint of the second side wall member; first and second end wall members; a channel at a bottom edge of the first and second end wall members and the first and second side wall members, said channel interrupted by said first gap and said second gap; a first support strap at an approximate midpoint of the first side wall member at a spaced distance beneath the top member and within the first gap; a second support strap at an approximate midpoint of the second side wall member at a spaced distance beneath the top member and within the second gap; a securing strap having first and second ends and running through the channel, said securing strap supported by the first and second support straps as it passes through the first and second gaps; and a buckle securing the first and second ends of the securing strap.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
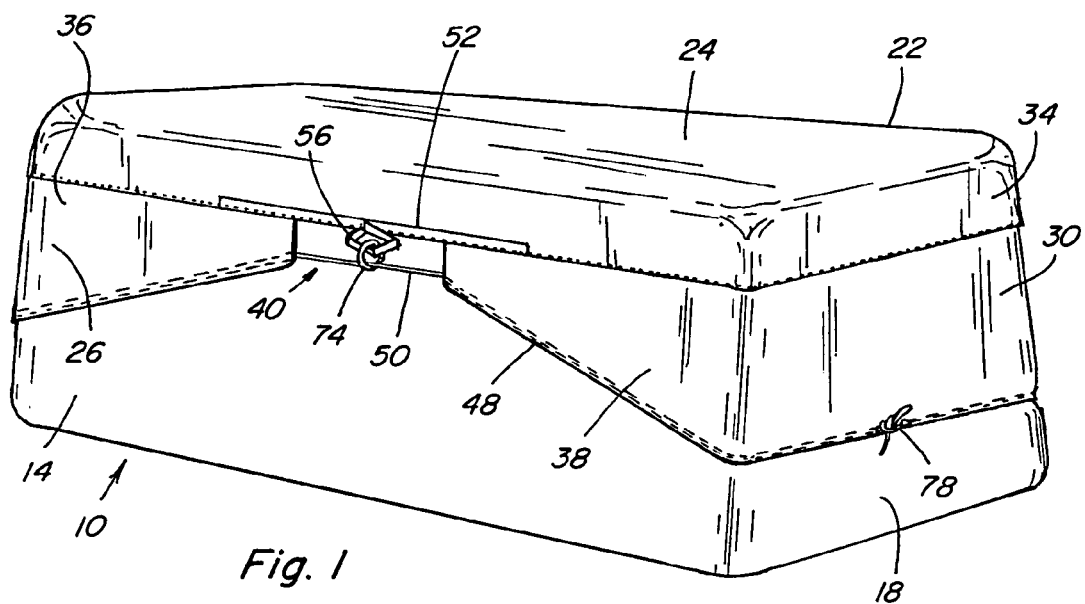
FIG. 1 is a perspective view of a cover for modules of fibrous material according to one embodiment of the present invention.
Figure 2:
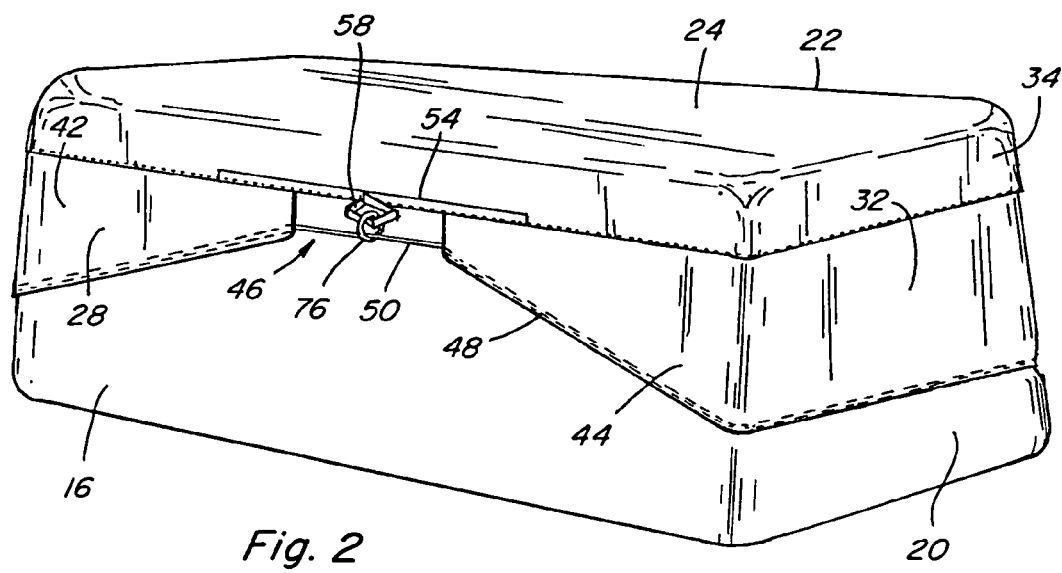
FIG. 2 is a perspective view of the opposite side of the cover of FIG. 1.
Figure 3A:
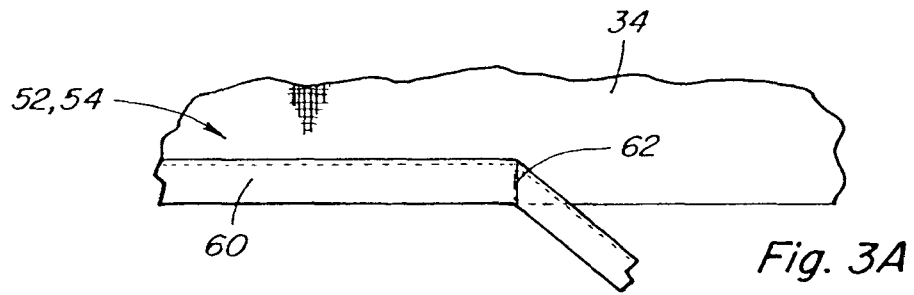
FIG. 3A is a view of a support strap of a cover for modules of fibrous material highlighting a first fold in the support strap.
Figure 3B:
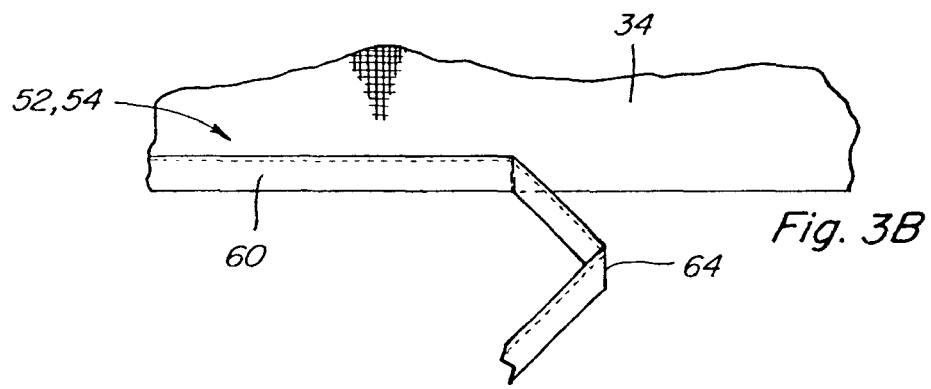
FIG. 3B is a view of the support strap of FIG. 3A highlighting a second fold in the support strap.
Figure 3C:
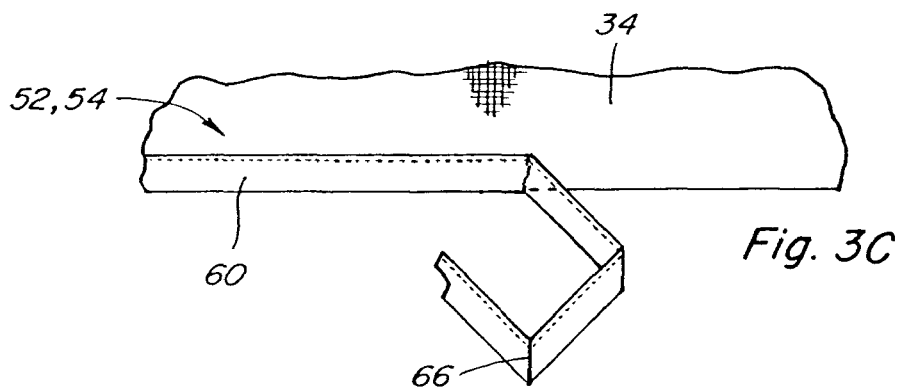
FIG. 3C is a view of the support strap of FIG. 3A highlighting a third fold in the support strap.
Figure 3D:
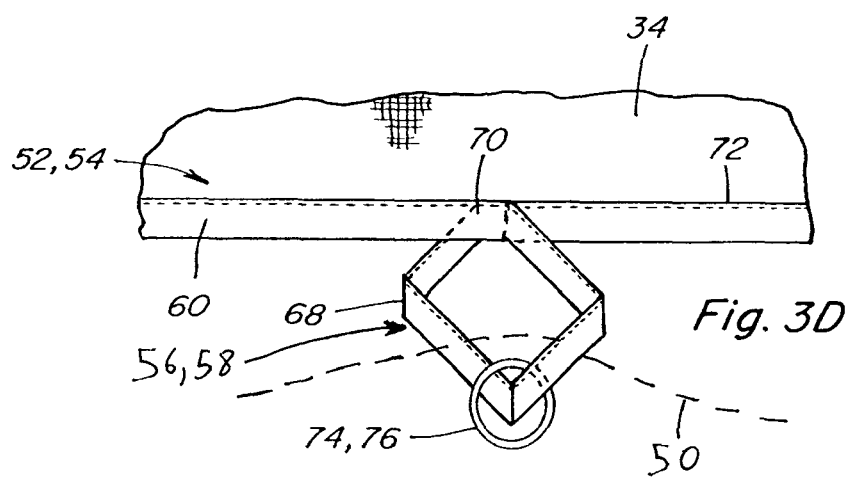
FIG. 3D is a view of the support strap of FIG. 3A in completed form.

FIGS. 1 and 2 illustrate a module of fibrous material 10 having a top 12, a first side 14, a second side 16, a first end 18, and a second end 20. Machines designed to compress harvested fibrous material into such modules are known in the art and an example is described in U.S. Pat. No. 4,184,425. Typical modules are brick-shaped and slightly wider and longer at the bottom than at the top, creating a somewhat trapezoidal shape. These modules are sufficiently compressed to retain their shape without binding or other restricting means.

An embodiment of the module cover is illustrated in FIGS. 1 and 2. The module cover 22 is arranged to protect at least a portion of the module 10 from the elements. The cover 22 includes a top member 24, a first side member 26, a second side member 28, a first end member 30 and a second end member 32, each of which protect their respective corresponding portion of the module. In the embodiment shown, the top 24, first 26 and second 28 side members and first 30 and second 32 end members are made from separate pieces of material that are joined to form the general shape shown by sewing, gluing, or any other suitable method. However, it is within the scope of the invention for each of these parts of the cover to be made from a single piece of material. The cover 22 can be constructed from any suitable material. In a preferred embodiment, the cover 22 is constructed from a water-repellent fabric such as canvas or plastic.

The top member 24 of the cover preferably covers the entire top of the module 10, while the first 26 and second 28 side members and first 30 and second 32 end members cover at least a portion of their respective sides and ends of the module 10. In the preferred embodiment illustrated in FIGS. 1 and 2, first 30 and second 32 end members extend from the top member 24 a distance of approximately two-thirds of the height of the module 10. The top member 24 extends a small distance over the side and end walls of the module 10 to form a cap-like structure 34.

The first side member 26 is formed from two roughly triangular sections of material 36, 38 which extend from the bottom of the first 30 and second 32 end members toward the middle of the cap structure 34 formed by the top member. Each triangular section 36, 38 terminates a short distance from the middle of the cap structure 34, thereby creating a gap 40 between the two triangular sections 36, 38. The second side member 28 is formed in an identical manner with first and second triangular sections 42, 44 having a gap 46 between the two.

The wall and end members of the cover 22 are provided with a channel 48 proximate their bottom edge. The channel 48 may be formed by folding over and securing a small width of the wall and end members. Alternatively, a separate channel member may be secured near the bottom of the members. Advantageously, the channel runs continuously from each of the side and end wall members to the next with minor exceptions. The channel is interrupted at each of the side wall members 26, 28 by the gaps 40, 46 between the triangular sections. The channel 48 is also partially interrupted near the middle of the first end wall member 30.

A securing strap 50, such as a cord, rope, string, shock cord, twine, strap, or belt is inserted into the channel 48 so that the securing strap 50 extends entirely around the perimeter of the module 10. The securing strap 50 may consist of a single piece of material that is not permanently fixed to the cover 22 at any place. Alternately, the securing strap 50 may be permanently fixed, by stitching, glue, welds or other methods, to one or more portions of the cover 22. In a preferred embodiment, the approximate midpoint of the securing strap 50 is affixed within the channel 48 at the midpoint of the second end wall member 32 of the cover. In another embodiment, the securing strap 50 consists of two pieces of material with one end of each piece of material being affixed within the channel at the midpoint of the second end wall member 32 of the cover.

The securing strap 50 is supported as it passes through the gaps 40, 46 in the first and second side walls 26, 28 by first 52 and second 54 support straps. In a preferred embodiment, each support strap 52, 54 is formed by a length of fabric or other material that is folded to form a loop 56, 58 and secured to the cap structure 34 above the respective gap 40, 46 by stitching, glue, welds, or other suitable methods. The support straps 52, 54 are formed by securing a first end 60 of the length of fabric to the cap structure 34. The length of fabric is folded a total of five times to create first 62, second 64, third 66, fourth 68, and fifth 70 angles and resulting in a diamond shape. In alternate embodiments, a loop is formed in the length of fabric by folding the fabric three times or simply by looping the fabric once. Finally, the remaining portion 72 of the length of fabric is secured to the cap structure 34. Prior to completion of the folds, a ring 74, 76 is slipped onto the length of fabric. Completion of the folds secures the ring 74, 76 within the loop 56, 58. Each fold in the length of fabric may be secured in place by stitching, glue, welds, or other suitable methods. In the preferred embodiment, the securing strap 50 passes through and is supported by the ring 74, 76. Alternately, in embodiments without a ring 74, 76, the securing strap 50 passes directly through the loop of fabric.

The use of a single support strap 52, 54 approximately centered on each side wall member 26, 28 of the cover 22 has been found to provide a more secure means of attaching the cover 22 to the module 10 compared to covers utilizing multiple similar structures. When the securing strap 50 is pulled tight to secure the cover 22 to the module 10, the bulk of the tensional force induced on the cover 22 by the securing strap 50 is focused on the single support straps 52, 54. In covers utilizing multiple support straps or similar structures, the tensional force is distributed evenly among the multiple support straps. In practice, it has been noted that during peak wind conditions, concentration of the tensional force of the securing strap on a single, centered position on the cap is significantly more effective in maintaining the "grip" of the cover on the module and reducing the likelihood of the cover being blown off or damaged. In particular, the areas located in the cotton belt of the United States are relatively flat and particularly prone to experiencing significant wind gusts. Therefore, it is imperative that covers for cotton modules are capable of withstanding the peak wind conditions that are prevalent in these areas.

In operation, the cover 22 may be folded for storage prior to use. After a module 10 has been formed, the cover 22 is unfolded and placed over the module 10 with the cap structure 34 covering the top of the module 10. Preferably, the securing strap 50 has been previously threaded through the channel 48 of the cover 22. The cover 22 is then positioned with the end wall members 30, 32 at least partially covering the ends 18, 20 of the module 10 and the side wall members 26, 28 at least partially covering the sides 14, 16 of the module 10. The securing strap 50 is then pulled as taut as possible to secure the cover 22 to the module 10. The securing strap 50 is held in place by a knot, buckle or similar device 78.

Other objects, features and advantages of the present invention will be apparent to those skilled in the art. While preferred embodiments of the present invention have been illustrated and described, this has been by way of illustration and the invention should not be limited.

What is claimed is:

1. A cover for a module of fibrous material, consisting of:
    a top member;
    a first side wall member defining a first gap approximately at a midpoint of the first side wall member;
    a second side wall member defining a second gap approximately at a midpoint of the second side wall member;
    first and second end wall members;
    a channel extending around the cover lengthwise along a bottom edge of the first end wall member, a bottom edge of the first side wall member, a bottom edge of the second end wall member, and a bottom edge of the second side wall member, said channel being interrupted by said first gap and said second gap,
    a first support strap at an approximately midpoint of the first side wall member at a spaced distance beneath the top member and within the first gap;
    a second support strap at an approximately midpoint of the second side wall member at a spaced distance beneath the top member and within the second gap;
    a securing strap having first and second ends and running through the channel, said securing strap supported by the first and second support straps as it passes through the first and second gaps, wherein each of the first and second support straps provide no more than one point of contact between the securing strap and the first and second support straps on respective sides of the module, thereby optimizing relocation of forces on the cover to enhance the cover's ability to withstand peak wind conditions; and a fastening mechanism securing the first and second ends of the securing strap.

2. The cover for a module of fibrous material as set forth in claim 1, wherein said first and second support straps each comprise a piece of elongated fabric folded to form a loop and secured to the cover and wherein said securing strap passes through said loop.

3. The cover for a module of fibrous material as set forth in claim 1, wherein said first and second support straps each comprise a piece of elongated fabric folded to form a loop and secured to the cover and a ring secured within said loop and wherein the securing strap passes through said ring.

4. The cover for a module of fibrous material as set forth in claim 3, wherein said first and second support straps are each folded to form a diamond shape.

5. The cover for a module of fibrous material as set forth in claim 1, wherein said first and second side wall members each comprise a pair of generally triangular sections separated by the first and second gaps, respectively.

6. The cover for a module of fibrous material as set forth in claim 5, wherein each triangular section of the first side wall extends from an opposite corner of the first side wall toward the first gap and wherein each triangular section of the second side wall extends from an opposite corner of the second side wall toward the second gap.

7. A cover for a module of fibrous material, consisting of
a top member;
a first side wall member defining a first gap approximately at a midpoint of the first side wall member;
a second side wall member defining a second gap approximately at a midpoint of the second side wall member;
first and second end wall members;
a channel extending around the cover along a bottom edge of the first end wall member, a bottom edge of the first side wall member, a bottom edge of the second end wall member, and a bottom edge of the second side wall member, said channel being interrupted by said first gap and said second gap,
a first support strap at an approximately midpoint of the first side wall member at a spaced distance beneath the top member and within the first gap, said first support strap formed by a piece of elongated fabric folded to form a first diamond-shaped loop and secured to the cover and a first ring secured within the loop;
a second support strap at an approximately midpoint of the second side wall member at a spaced distance beneath the top member and within the second gap, said first and second support straps each comprise a piece of elongated fabric folded to form a second diamond-shaped loop and secured to the cover and a second ring secured within the loop;
a securing strap having first and second ends and running through the channel, said securing strap supported by the first and second rings as it passes through the first and second gaps, wherein each of the first and second support straps provide no more than one point of contact between the securing strap and the first and second support straps on respective sides of the module, thereby optimizing relocation of forces on the cover to enhance the cover's ability to withstand peak wind conditions; and
a fastening mechanism securing the first and second ends of the securing strap.

8. A method of securing a cover to a module of fibrous material having a top, first and second sides and first and second end, comprising the steps of:

placing a cover over the module with said cover encompassing the top of the module and at least a portion of the first and second sides and first and second ends;
threading a securing strap through a channel in the cover and through first and second support straps on the cover located at the approximately midpoint of the first and second sides of the module, wherein each of said first and second support straps provide no more than one point of contact between the securing strap and the first and second support straps on respective sides of the module, thereby optimizing relocation of forces on the cover to enhance the cover's ability to withstand peak wind conditions; and
tightening the securing strap about the module.

9. A cover for a module of fibrous material, consisting of:
a top member;
a first side wall member;
a second side wall member;
first and second end wall members;
a channel extending around the cover along a bottom edge of the first end wall member, a bottom edge of the first side wall member, a bottom edge of the second end wall member, and a bottom edge of the second side wall member;
a first support strap at an approximately midpoint of the first side wall member;
a second support strap at an approximately midpoint of the second side wall member;
a securing strap having first and second ends and running through the channel, said securing strap supported by the first and second support straps, where the first and second support straps provide no more than one point of contact between the securing strap and each of the first and second support straps on their respectively sides of the module, thereby optimizing relocation of forces on the cover to enhance the cover's ability to withstand peak wind conditions.

10. The cover for a module of fibrous material as set forth in claim 9, wherein said first and second support straps each comprise a piece of elongated fabric folded to form a loop and secured to the cover and wherein said securing strap passes through said loop.

11. The cover for a module of fibrous material as set forth in claim 9, wherein said first and second support straps each comprise a piece of elongated fabric folded to form a loop and secured to the cover and a ring secured within said loop and wherein the securing strap passes through said ring.

12. The cover for a module of fibrous material as set forth in claim 11, wherein said first and second support straps are each folded to form a diamond shape.

13. The cover for a module of fibrous material as set forth in claim 9, wherein said first and second side wall members each comprising a pair of generally triangular sections separated by the first and second gaps, respectively.

14. The cover for a module of fibrous material as set forth in claim 13, wherein each triangular section of the first side wall extends from an opposite corner of the first side all toward the first gap and wherein each triangular section of the second side wall extends from an opposite corner of the second side wall toward the second gap.

15. The cover for a module of fibrous material as set forth in claim 1, wherein each of the end wall members extends down from the top member to cover approximately ⅔ of the height of the module.

* * * * *